United States Patent
Yamamoto et al.

(10) Patent No.: US 9,161,277 B2
(45) Date of Patent: Oct. 13, 2015

(54) MOBILITY CONTROL METHOD MITIGATING INTER CELL INTERFERENCE AND BASE STATIONS WHICH ADOPT THE METHOD

(75) Inventors: Tomonori Yamamoto, Fujisawa (JP); Satoshi Tamaki, Yokohama (JP); Rintaro Katayama, Fujisawa (JP); Hirotake Ishii, Yokohama (JP)

(73) Assignee: HITACHI, LTD., Tokyo (JP)

( * ) Notice: Subject to any disclaimer, the term of this patent is extended or adjusted under 35 U.S.C. 154(b) by 446 days.

(21) Appl. No.: 13/025,275

(22) Filed: Feb. 11, 2011

(65) Prior Publication Data
US 2011/0211560 A1 Sep. 1, 2011

(30) Foreign Application Priority Data
Feb. 26, 2010 (JP) ................. 2010-041495

(51) Int. Cl.
*H04W 36/00* (2009.01)
*H04W 36/20* (2009.01)

(52) U.S. Cl.
CPC .......... *H04W 36/20* (2013.01); *H04W 36/0083* (2013.01)

(58) Field of Classification Search
CPC .......................... H04W 36/0083; H04W 36/20
USPC .......... 370/338, 329; 455/444, 443, 446, 552
See application file for complete search history.

(56) References Cited

U.S. PATENT DOCUMENTS

| | | | |
|---|---|---|---|
| 5,640,677 A | 6/1997 | Karlsson | |
| 2002/0042276 A1* | 4/2002 | Hakalin et al. | ................ 455/453 |
| 2004/0162074 A1 | 8/2004 | Chen | |
| 2004/0214575 A1* | 10/2004 | Jovanovic | ..................... 455/444 |
| 2005/0083895 A1* | 4/2005 | Pinault | ........................... 370/338 |
| 2008/0056190 A1* | 3/2008 | Kim | ............................... 370/331 |
| 2009/0086672 A1 | 4/2009 | Gholmieh et al. | |
| 2009/0197603 A1 | 8/2009 | Ji et al. | |

(Continued)

FOREIGN PATENT DOCUMENTS

| | | |
|---|---|---|
| JP | 08-154265 | 6/1996 |
| JP | 2009-159637 | 7/2009 |
| WO | WO 95/35007 | 12/1995 |

(Continued)

OTHER PUBLICATIONS

JP Office Action for Japanese Application No. 2013-163899, issued on Apr. 1, 2014.

*Primary Examiner* — Khaled Kassim
(74) *Attorney, Agent, or Firm* — Baker Botts L.L.P.

(57) ABSTRACT

Interference applied to neighbor cells during terminal handovers can be reduced in wireless communication systems containing base stations having different cell sizes. A serving cell makes handover judgment criteria easier based on pre-acquired cell size information on its own cell and cell size information of neighbor cells in order to facilitate terminal handovers from a base station with a large cell size to a base station with a small cell size. The serving cell finds evaluation function values based on the propagation state (e.g. reference signal received power) between the terminal and target cell, and the interference and load information exchanged between the base stations, and selects the terminal for handover by comparing the evaluation function value with the handover criteria value. The system selects a target cell having a good effect in lowering interference such as a cell with large reference signal received power acquired from a terminal, to serve as the handover destination.

15 Claims, 20 Drawing Sheets

(56) References Cited

U.S. PATENT DOCUMENTS

| | | | |
|---|---|---|---|
| 2010/0056160 A1* | 3/2010 | Kim et al. | 455/444 |
| 2011/0250891 A1* | 10/2011 | Zou et al. | 455/437 |
| 2013/0337811 A1* | 12/2013 | Faerber et al. | 455/436 |
| 2014/0301369 A1* | 10/2014 | Kubota | 370/331 |

FOREIGN PATENT DOCUMENTS

| | | |
|---|---|---|
| WO | WO 2009/045968 | 4/2009 |
| WO | WO 2009/064931 | 5/2009 |
| WO | WO 2009/097070 | 8/2009 |
| WO | WO 2010/017221 | 2/2010 |

* cited by examiner

FIG. 14

| TARGET CELL ID | #2 | #3 | #4 |
|---|---|---|---|
| COVERAGE AREA | LARGE | SMALL | VERY SMALL |
| ADJUST | ↑ | ↓ | ↓ |

FIG. 15

| CELL SIZE DIFFERENCE | CONTROL QUANTITY | CELL SIZE DIFFERENCE | CONTROL QUANTITY |
|---|---|---|---|
| -30 | -6 | 5 | +1 |
| -25 | -5 | 10 | +2 |
| ... | ... | ... | ... |
| 0 | 0 | 30 | +5 |

| LOAD BALANCE THRESHOLD | CONTROL QUANTITY |
|---|---|
| +20 | −4 |
| +15 | −3 |
| ... | ... |
| 0 | 0 |

| COVERAGE INFORMATION TABLE | | |
|---|---|---|
| NEIGHBOR CELL ID | TRANSMIT POWER | TILT |
| 1000 | 46 dBm | 5° |
| 1001 | 43 dBm | 10° |
| ... | ... | ... |
| 50000 | 13 dBm | – |
| 50001 | 10 dBm | – |

| RECEIVED POWER REPORT TABLE | | | | |
|---|---|---|---|---|
| UE # | CELL #1 | CELL #2 | CELL #3 | CELL #4 |
| 1 | 10 | 10 | 20 | – |
| 2 | 10 | 15 | – | – |
| ... | ... | ... | ... | ... |
| 30 | 5 | – | 5 | 10 |
| 31 | 20 | – | 10 | 15 |

SERVING CELL    TARGET CELLS

FIG. 23

INTERFERENCE MANAGEMENT TABLE 4013

| RB # \ CELL # | 1 | 2 | 3 | 4 | 5 | 6 | 7 | 8 | 9 |
|---|---|---|---|---|---|---|---|---|---|
| 2 | 1 | 2 | 2 | 1 | 0 | 2 | 0 | 0 | 0 |
| 3 | 0 | 1 | 0 | 0 | 1 | 2 | 0 | 1 | 2 |
| 4 | 0 | 0 | 1 | 0 | 0 | 0 | 1 | 0 | 0 |

CELL #2

CELL #3

CELL #4

MOBILITY CONTROL METHOD MITIGATING INTER CELL INTERFERENCE AND BASE STATIONS WHICH ADOPT THE METHOD

CLAIM OF PRIORITY

The present application claims priority from Japanese patent application JP 2010-041495 filed on Feb. 26, 2010, the content of which is hereby incorporated by reference into this application.

FIELD OF THE INVENTION

The present invention relates to a mobility control method mitigating inter cell interference and base stations which adopt the method, and more particularly to abase station, a wireless communication system and a mobility control method mitigating inter cell interference including mobility control technology for mitigating inter cell interference in cellular wireless communication systems using OFDMA (Orthogonal Frequency Division Multiple Access).

BACKGROUND OF THE INVENTION

The structure of a typical cellular wireless communication system is described next while referring to the concept diagram in FIG. 1. In a cellular wireless system, the wireless base stations 1201 cover an area called a cell. The cell may be called by names such as a target cell; microcell, serving cell, or femtocell according to the width of that coverage range and type of function. The cell providing the largest coverage area for the cellular wireless base station 1201 is also called a target cell base station and may accommodate mobile stations 1203 within an area of approximately several hundred to several thousand meters. The base station 1201 is capable of communication with IP networks or connecting "calls" between mobile stations 1203 at positions separated from each other, by way of a core network 1202 made up of upstream devices such as the base station control device, etc.

Third generation cellular wireless communication systems using the CDMA (Code Division Multiple Access) method can communicate multimedia information by way of an IP network. Wireless systems utilizing CDMA include for example UMTS (Universal Mobile Telecommunications System) and EVDO (Evolution Data Optimized). The enriched mobile contents in this environment have created greater demand in the form of needs for higher speed broadband communication services. Support for wideband communications in forms such as best effort type, voice communication by VoIP, and content distribution such as video via streaming information is expected to come into general use.

Wireless communication systems that utilize OFDMA (Orthogonal Frequency Division Multiple Access) method are the focus of much attention, as next generation wireless communication systems to replace CDMA in view of their wide-bandwidth and high-speed. The OFDMA method utilizes a hardware configuration better suited for wide bandwidths than the CDMA method and is better able to provide large capacity wireless communications.

The OFDMA method is technology that improves bandwidth resource utilization efficiency by multiplexing multiple orthogonal carrier waves (frequency sub-carriers) onto the frequency bandwidth. Cellular wireless communication systems utilizing the OFDMA method are classified as beyond 3G (generation) cellular wireless communication systems and typical standards include E-UTRA (Evolved-UMTS Terrestrial Radio Access). This E-UTRA also called LTE (Long Term Evolution) has been established as an international standard by the 3GPP (3rd Generation Partnership Project) which is a standardization group. The title E-UTRA indicates a wireless access method, while E-UTRAN (Evolved-UMTS Radio Access Network) indicates an access network.

Radio frequency interference from adjacent base stations and from terminals grouped under those base stations is known to effect communications during wireless access that connects terminals and base stations in wireless communication systems. Interference from adjacent base stations and terminals grouped under those base stations is known to be especially large in OFDMA wireless communication systems, and base station installation design is a highly difficult task.

During wireless access at cell edges which are boundaries between base station coverage areas (separation between sectors and cells, etc.) the desired signal level from the cell itself must compete with the interference power level from neighboring cells. These rival signal levels cause a drastic deterioration in SINR (Signal-to-Interference-and-Noise-Power-Ratio) which is an index indicating channel quality.

In the overall system, reducing the interference between neighboring cells fulfills an important function in improving channel capacity during wireless access. Reducing interference between neighboring cells mainly focuses on lowering the transmit power of all wireless stations to the minimum required level. However, simply suppressing the power level will cause problems such as shrinking the coverage area or lowering the communication speed. The excess power must therefore first be specified before lowering the power level.

Controlling interference during wireless access uplinks heavily involves curbing the transmit power of terminals in the cell edge. Terminals located at the cell edge must overcome the transmission path loss that occurs between the base stations while also maintaining a specified communication quality and so need high power during transmissions. A method disclosed in JP 2009-159637 was therefore proposed, that gives selection priority to cell management by base stations Whose terminals have small transmission path loss.

Suppressing the transmission power while maintaining a specified communication quality requires allocating more bandwidth resources than usual and lowering the rate for encoding error correcting symbols. Lowering the power will reduce interference but increases the load during wireless accessing due to greater use of bandwidth resources.

Besides lowering interference during wireless access as described above, load dispersion control between cells is required at locations where terminal connections are concentrated. If the load exceeds the processing capacity of the base station backbone then there is a high probability that call connections will be difficult to establish.

Approaches have been studied for achieving load dispersal by active use of handovers to neighboring cells. Handover algorithms in wireless systems must comply with the standard specified entity and procedures.

SUMMARY OF THE INVENTION

Consider the state where two base stations with cell having different radii are adjacent to one another. The location where the base station is installed and the application will result in the irregular cell sizes as shown in FIG. 4. In a metropolitan area for example, the terminals are densely concentrated so accommodating the terminal in a base station using only cells with a large radius such as macro cells will prove difficult in view of the base station load.

Measures to eliminate this problem include macro cell support by installing compact base stations utilizing a small cell size such as microcells and picocells. Another method under actual study is use of ultra-compact base stations using femtocells and installable in the home.

When more than one base station having different cell sizes are adjacent to each other as shown above, the distance (path) loss between the base station and terminal becomes irregular. Cell edge terminals belonging to large radius cells as shown in FIG. 5 use large power during upstream transmission in order to compensate for this distance loss (503 in the figure) and deliver the required power. In contrast, cell edge terminals belonging to small radius cells transmit upstream at comparatively low power (501 in the figure).

In this case, as shown in FIG. 4, the large power emitted by a terminal belonging to a large radius cell interferes with communication by a cell edge terminal belonging to a small radius cell, due to the large interference power. So making a handover of cell edge terminal belonging to a large radius cell, to a cell edge terminal belonging to a small radius cell is likely to lower the interference applied to neighbor cells (bottom drawing in FIG. 4). Therefore terminals should preferably belong to cells having a small cell size as possible.

However, simply performing a handover on a path subject to distance loss will cluster the terminals in specific cells causing an overwhelming load. Moreover there will be no further resources (bandwidth) available to allocate, and the cell will become vulnerable to interference from neighbor cells, resulting in possible system collapse.

In view of the above problems with the related art, the present invention has the object of providing a base station, a wireless communication system, and a mobility control method mitigating inter cell interference to perform terminal handovers so as to lessen the extent of interference applied to the system from interference information exchanged between base stations and neighbor base station information from the terminals. Another object of the present invention is to boost channel capacity as seen by the overall system and improve the overall cell throughput.

The present invention relates to handover technology utilizing the interference levels applied to neighbor cells as criteria. This invention provides a method for detecting terminals that apply the largest interference level to neighbor cells, and a method to decide the handover destination base station.

An object of the invention is to disperse the load by promoting handover from cells with a large terminal-connected load to cells with a small terminal connected load, and also to suppress interference between cells to a minimum. The present invention provides criteria for handovers, and a scheduling method for lowering the interference.

The example given in this invention describes a system in which a serving cell (handover source) regulates handovers of terminals within its area. The serving cell decides the terminal for lowering the interference level between more than one target cell (handover candidate) in the overall system, and decides the handover destination for obtaining a load balance.

The serving cell includes an evaluation function that is based on the propagation state between the terminal and target cells, and interference and load information exchanged between the target cell and serving cell. The serving cell selects the terminal to be handed over after mediating between the applicable function and the handover criteria values. The serving cell selects the target cell rendering the largest effect in lowering the interference level after handover, and then hands over the terminal to that cell. The target cell reflects its own cell load information in the interference information notified to the serving cell.

The wireless base station of the present invention is for example a wireless base station connected over a network to one or more base stations. This wireless base station contains a handover parameter control block to generate the handover judgment criteria value and the interference judgment criteria by utilizing the interference information exchanged between more than one base stations possessing different cell ID, and power information for neighbor base station that was reported from the terminals, and the cell size of the neighbor cells, and the load information from its own cell and other cells.

The load information may for example be the number of terminals connected to a cell. The hardware usage rate exchanged between base stations may also be utilized as load information.

The interference information may for example be passive interference information exchanged between base stations. An overload indicator may be utilized as the passive interference information.

The handover parameter control block in the base station changes the interference judgment criteria by comparing the cell size with neighboring cells. The handover parameter control block also changes the handover judgment criteria value by comparing the cell size with neighboring cells.

The handover parameter control block in the base station changes the interference judgment criteria according to the load information. This handover parameter control block also changes the handover judgment criteria according to the load information.

The base station further contains a handover judgment block to specify terminals that exceeded the handover terminal criteria, by forming an evaluation function for rating the effect of lowering interference levels on the system from power information on neighbor cells reported by the terminals, and from interference information exchanged between base stations, and comparing the handover judgment criteria with the applicable evaluation function. The evaluation function produced by the handover judgment block for rating each terminal reporting neighbor station power information, may be set so as to use the total found from multiplying values weighted according to the attenuation from the distance between the applicable terminals, by one or more interference information reported by the applicable neighbor base station.

The base station whose cell has the smallest evaluation function after the terminal moves; may be set as the handover destination base station for the terminal that the handover judgment block specifies for handover.

The handover parameter control block may handle the interference information generated in weighted values in resource block unit.

In a first resolution aspect of the present invention, a base station for reducing radio wave interference in wireless communication systems includes multiple base stations of different cell sizes, in which, the base station receives cell size information that was received on neighbor base stations and cell size information on its own base station, decides based on the cell size information whether the cell size of its own base station is larger than the cell size of neighbor base stations, and if the cell size of its own base station is larger, provides the terminal within its own base station cell to make handover easier to the cell of a neighbor base station.

In a second resolution aspect of the present invention, a wireless communication system for reducing radio wave interference includes multiple base stations of different cell sizes, in which, each base station receives cell size information on neighbor base stations and cell size information on its own base station, decides based on the cell size information whether the cell size of its own base station is larger than the cell size of neighbor base stations, and if the cell size of its own base station is larger, provides the terminal within its own base station cell to make handover easier to the cell of a neighbor base station.

In a third resolution aspect of the present invention, a mobility control method mitigating inter cell interference for reducing radio wave interference in wireless communication systems includes multiple base stations of different cell sizes, in which, the base station receives cell size information on neighbor base stations and cell size information on its own base station, decides based on the cell size information whether the cell size of its own base station is larger than the cell size of neighbor base stations, and if the cell size of its own base station is larger, provides the terminal within its own base station cell to make handover easier to the cell of a neighbor base station.

The present invention makes terminal handovers that lower the interference levels applied to the system by utilizing information from interference information exchanged between base stations, and from neighbor base station information from terminals; and improves the channel capacity as seen by the overall system leading to an effect that improves the overall cell throughput.

BRIEF DESCRIPTION OF THE DRAWINGS

FIG. 14 is an overview of the handover criteria value adjustment made according to the difference in cell size;

FIG. 15 is a drawing for describing an example of adjusting the handover criteria value by referring to the table;

FIG. 21 is a table for managing the cell size information;

FIG. 22 is a table for managing the power notification value reported from the terminal;

FIG. 23 is a table for managing the interference level from the neighbor cells;

DETAILED DESCRIPTION OF THE PREFERRED EMBODIMENTS

Figure 1:
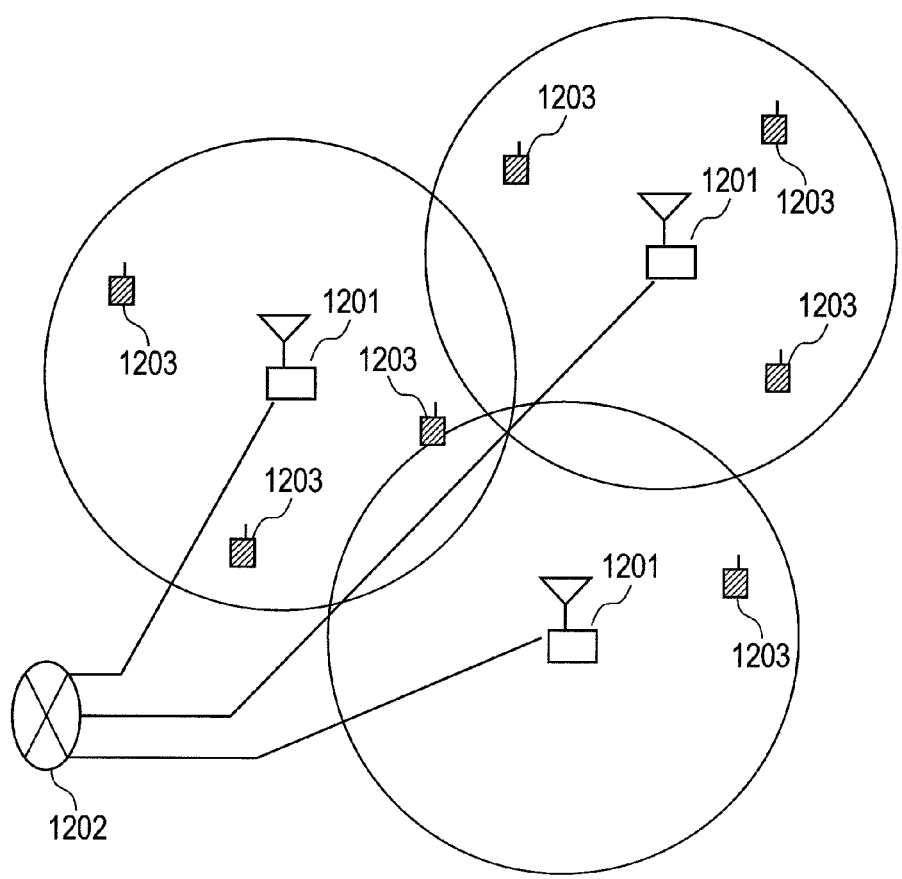
FIG. 1 is a drawing for describing a typical wireless system.

The following description is given separately for a number of embodiments for implementing this invention. The following embodiments may be implemented separately or in combination. In the following description, the same reference numerals indicate the performance or function in the operation and redundant descriptions are omitted.

First Embodiment

Figure 2:
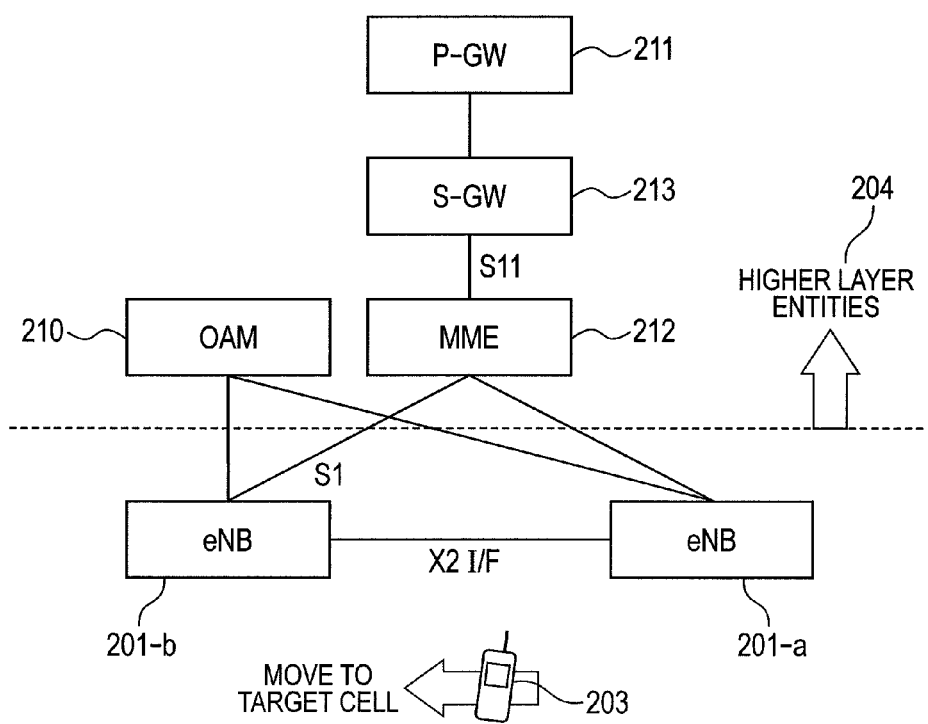
FIG. 2 is block diagram for describing device connections for Intra-MME handovers.
Figure 3:
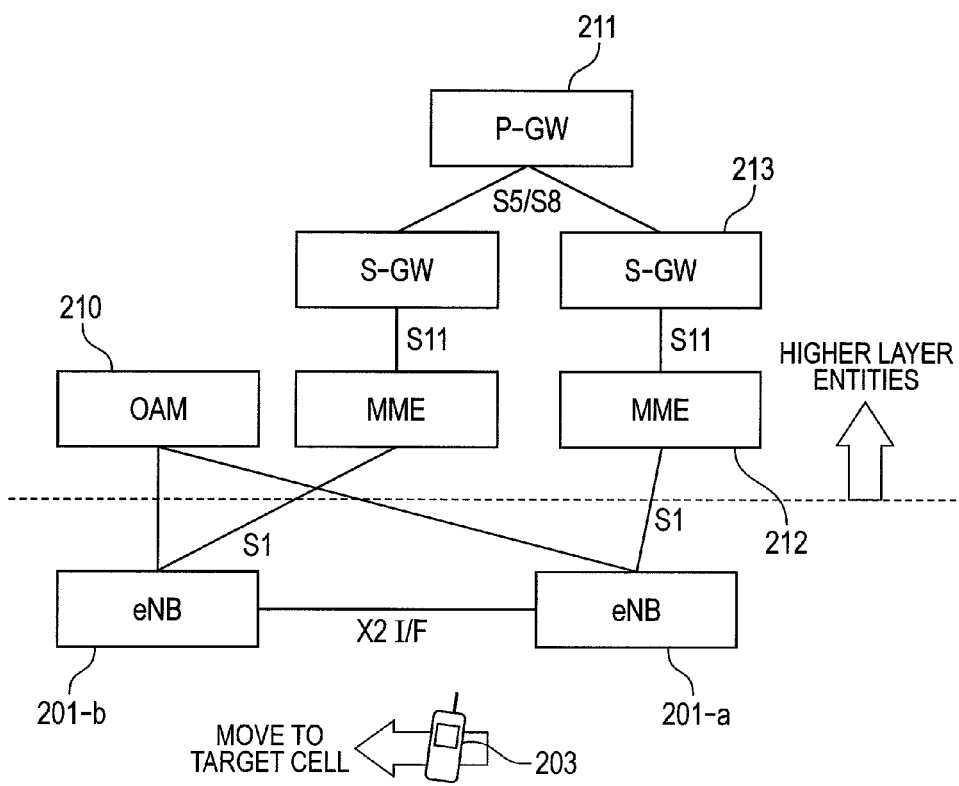
FIG. 3 is block diagram for describing device connections for Intra-MME handovers.
Figure 4:
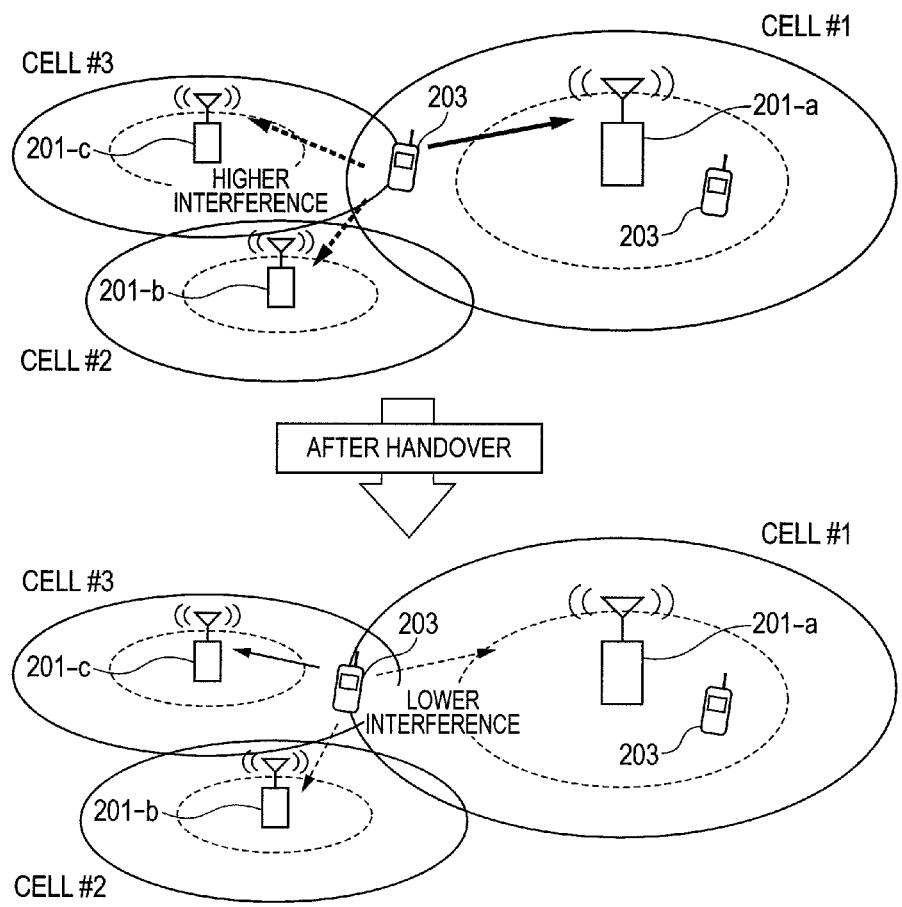
FIG. 4 is drawings for describing use of handovers to lower system interference.
Figure 5:
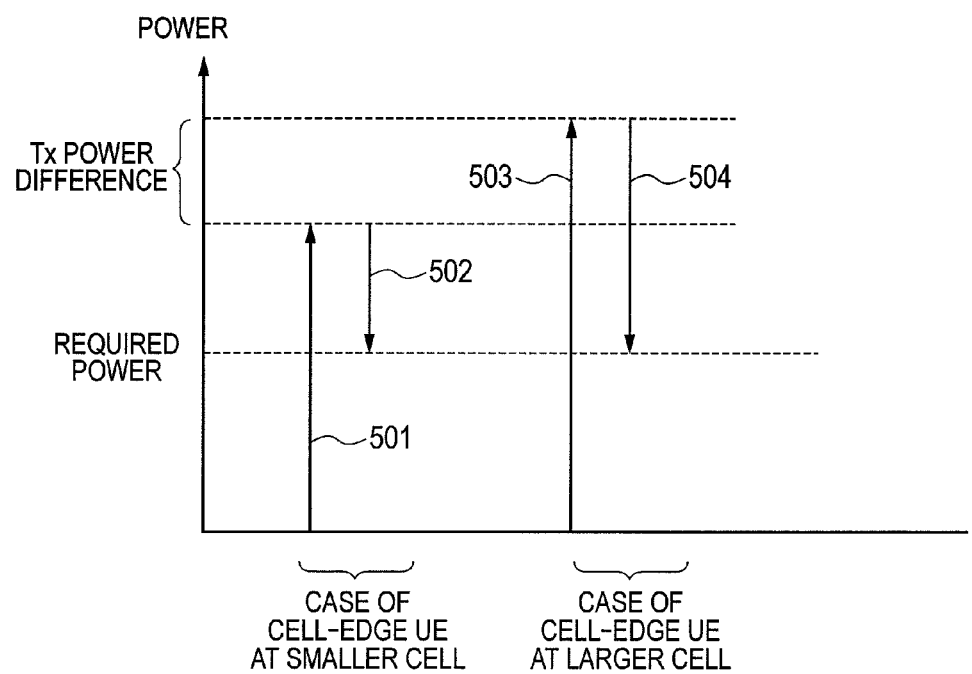
FIG. 5 is a graph showing the differences in cell edge terminal transmit power due to the difference in the radius of the cells.

Specific examples of the E-UTRAN entity structure are shown in FIG. 2 and FIG. 3. FIG. 2 is a block diagram showing device connections relating to handovers among base stations monitored by a single MME (Mobile Management Entity) 212. FIG. 3 is a block diagram showing device connections relating to handovers among base stations by way of different MME.

Handovers made by the E-UTRAN can be broadly grouped into two types. In both cases the procedures for establishing the bearer connection are different but the processing between the terminal (UE) 203 and the base station 201-*a* is approximately the same.

The higher layer entity 204 utilized in the following description is a section or a collective name for the OAM (Operation And Maintenance) device 210, MME212, S-GW (Serving-GateWay), P-GW (Packet Data Network-GateWay). The OAM device 210 includes a base station control device (EMS: Element Management System).

Figure 25:
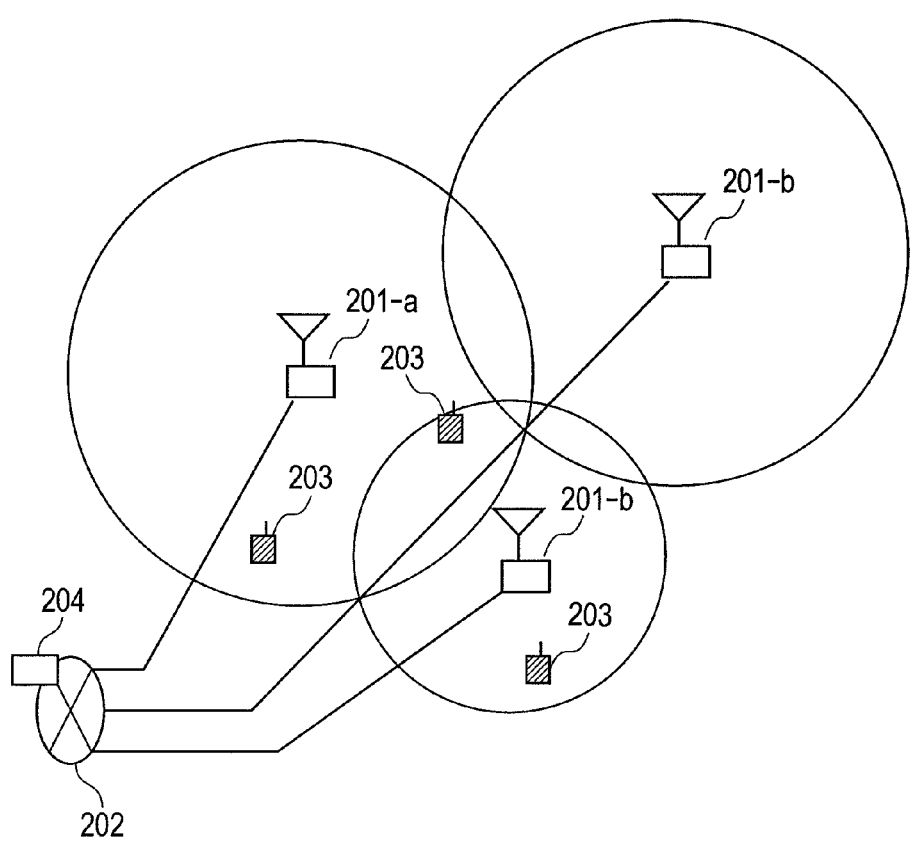
FIG. 25 is a diagram showing the structure of the wireless communication system of this embodiment.

FIG. 25 is a diagram showing the structure of the wireless communication system of this embodiment. The wireless communication system includes for example, plural base stations 201 and a higher layer entity 204. These base stations 201 include base stations having different cell sizes (cell sizes). Each of the base stations 201 communicates by radio with a terminal 203 within the cell covered by its own base station. Base station coverage may also include multiple cells (also called sectors).

The description for the embodiments utilizes base stations having cell with different radii but the base stations may for example have different cell characteristics such as radio wave (RF) characteristics or parameters relating to radio wave footprint range, transmit power, radio wave footprint distance. The embodiment moreover is not limited to identification by way of the cell size and for example may possess directivity. The embodiment moreover is not limited to the above characteristics and the base stations may differ in the extent to which the radio waves interfere with other radio waves during communication with a terminal. Information corresponding to the cell size information described later on may also be utilized.

Figure 6:
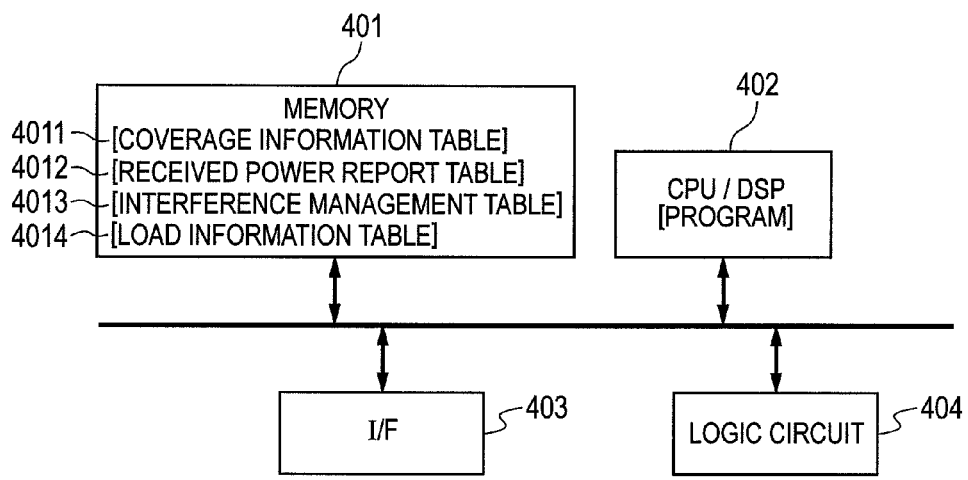
FIG. 6 is a diagram for describing the hardware structure of the base station control device.

FIG. 6 is a structural view of the hardware for the base station control device. The base station control device may consist of structure added to the usual base station may be used, or a structure integrated with the base station. The base station control device contains for example a memory 401, a processor unit 402, an interface 403, and a logic circuit 404. The memory 401 for example may contain a (cell) coverage information table 4011, a received power report table 4012, an interference management table 4013, and a load information table 4014. These tables are described later on.

Figure 7:
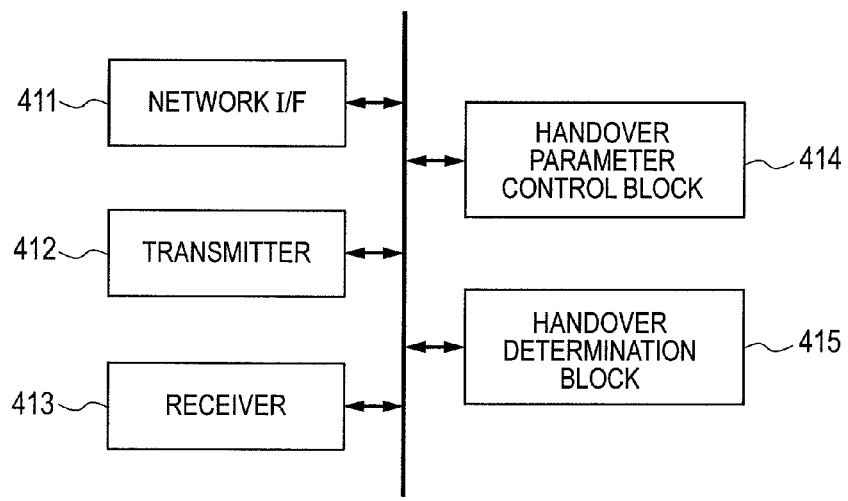
FIG. 7 is a block diagram showing the function blocks of the base station of the present invention.

FIG. 7 is a block diagram showing the function blocks of the base station of the present embodiment.

The network I/F (interface) 411 is a block for managing the interface for communicating with the higher layer entity 204 or with another base station.

The transmitter 412 transmits a wireless signal to the terminal 203 to implement signal process in compliance with wireless standards such as modulation processing and error correction coding.

The receiver 413 receives the wireless signal from the terminal 203 and performs demodulation processing and error correction decoding, etc.

The handover parameter control block 414 manages the handover parameters (step 2103) of FIG. 8 described later on, based on information received for example from the network I/F unit 411.

The handover judgment block 415 decides the terminal 203 to handover, and the target cell serving as the handover destination based on the control shown later on in step 2104.

The installed base station possessing the above characteristics may be implemented by either dedicated hardware combined with the logic circuit 404, or program processing utilizing the DSP402.

FIG. 21 is a drawing showing a cell size information table for managing the cell size information.

A coverage information table (or cell size information table) 4011 stores cell size information that for example matches the cell ID of the neighbor cells. In the example in FIG. 21, the coverage information table 4011 stores transmit power information from the base station and the antenna tilt as the cell size information. The transmit power information from the base station and the antenna tilt shown in FIG. 21 are an example of information showing cell characteristics, and an example of base station attribute information making up the cell.

FIG. 22 is a drawing for describing the received power report table for managing the power notification value reported from the terminal. The received power report table 4012 for example stores the serving cell received power value and the target cell received power values for each terminal ID. The received power report table 4012 can also store the target cell received power for cells able to receive radio waves from the terminal.

FIG. 23 is a drawing for describing the interference management table for managing the level of interference from the neighbor cells.

The interference management table 4013 for example stores interference information corresponding to the cell ID and the resource block ID.

Figure 24:
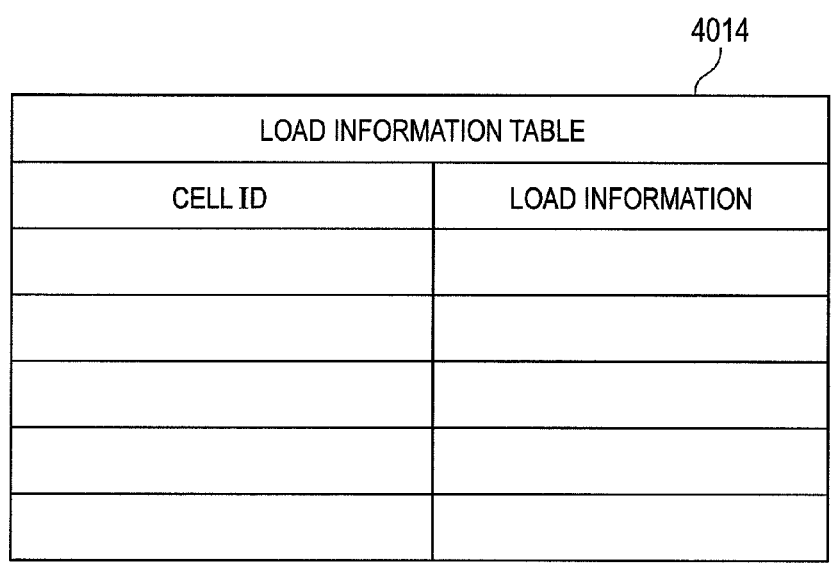
FIG. 24 is a drawing for describing the load information table.

FIG. 24 is a drawing for describing the load information table. The load information table 4014 stores for example load information for the cell corresponding to the cell ID.

A pre-assigned number (No.) and symbol can be utilized for each ID.

Figure 8:
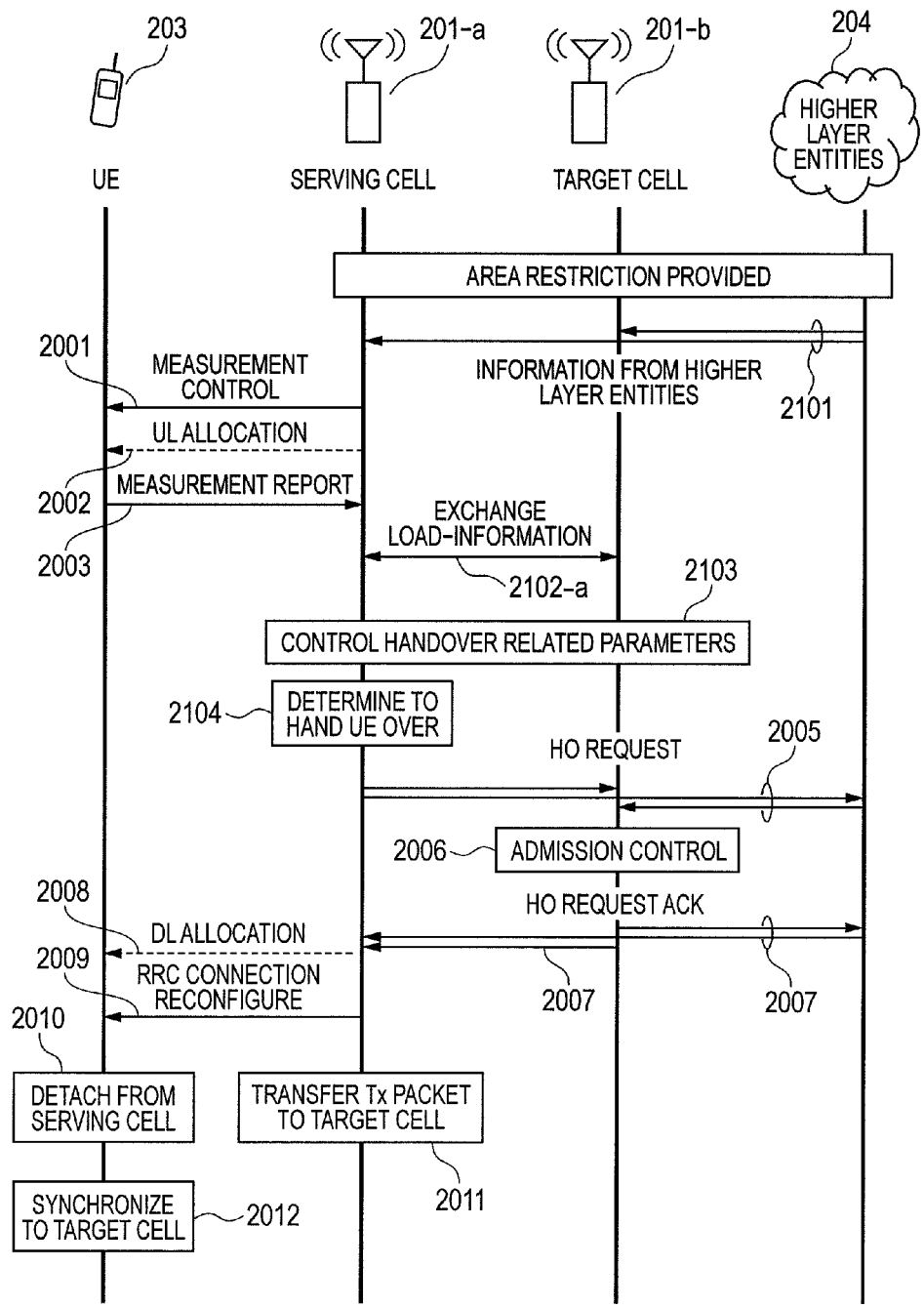
FIG. 8 is a handover sequence diagram for the first embodiment of the present invention.

FIG. 8 is a drawing for describing the handover setup operation performed between the terminal 203, the serving cell 201-a serving as the base station communicating with the terminal 203, and the target cell 201-b serving as the handover candidate base station.

In step 2101, the higher layer entity 204 reports the cell ID of the serving cell 201-a, the target cell 201-b, and information on the pre-established cell sizes (cell size information).

The cell size information can be exchanged between source base station and target base station directly or via the higher layer entity 204. For example, regarding LTE system, X2AP or S1AP, which are protocols between base stations, contains "handover request" message. "Handover request" includes cell size information. This message is exchanged when the source base station hand the terminal over the target base station. The base stations memorize and manage the information of cell size so as to control hand over related values.

The cell size information may also consist of transmit power information itself reported from the base station. The cell size of neighboring cells can be estimated with higher accuracy if the upstream device 204 reports information relating to the sector gain or the antenna gain. Moreover, the upstream device can specify cell ID capable of identifying the type of base station such as picocell base stations or femtocell base stations as the cell size information. If these types of information are available then the base station can know the overall transmit power of the neighbor base stations, and the cell sizes of the neighbor cells. For example, the type of base station and the cell size or the transmit power information corresponding to the cell ID can be stored in each base station. Besides power information, information relating to the antenna tilt may be reported since this information strongly relates to the cell size information.

The cell size information may from hereon contain any one or multiple information types described above.

The table (FIG. 21: Coverage Information Table 401) in the memory may store the cell size information generated here by these neighboring cells. In the example in FIG. 21, the coverage information table 4011 stores the transmit power information and tilt corresponding to the cell ID. The information is updated and utilized each time the cell information is change due to installation of new base stations, etc. Methods to detect changes in base station information may even include self-detection by measurements, may judge reports from the terminals, and may also be dependent on commands reported from the upstream device 204.

In step 2001, the serving cell 201-a makes the terminal 203 measure the receive signal quality of reference signals from the serving cell 201-a and one or more target cells 201-b. The received signal quality may consist of the received power intensity, or the SINR (Signal to Interference and Noise Ratio), or the transmission path loss calculated from the differential between the transmit power information and the received power intensity.

In step 2002, the serving cell 201-a allocates the uplink resources (UL allocation) to the terminal, 203 for reporting measurement values in step 2003. In step 2003, the terminal 203 reports the measured received signal quality from the serving cell 201-a and the target cell 201-b. In E-UTRA for example, the terminal 203 reports the received power intensity of a reference signal called RSRP (Reference Signal Received Power).

In step 2102-a, the base stations exchange load information and interference information. The base stations may exchange information by methods such as cable or radio. In E-UTRAN for example, which is a cellular wireless communication standard, a cable interface and X2 I/F (interface) specified for information exchange between base stations are provided.

In the base station 201, information such as the hardware usage rate, the wireless resource usage rate, the number of connected terminals, the line capacity of the base station back hauls line (line for connecting to backbone network) and its usage rate may be utilized as the load information. A hardware load indicator may also be utilized assumed use of E-UTRAN (TR36, 423).

Similarly, the received interference level or the applied (transmitted) interference levels may be utilized as the interference information. A load indicator may be utilized assuming use of E-UTRAN (TR36, 423).

The serving cell 201-*a* stores the received interference information and the load information respectively in the interference management table 4013, and a load information table 4014.

In the handover parameter control 2103, the serving cell 201-*a* generates handover judgment criteria values by utilizing the interference information exchanged between one or more base stations possessing different cell ID, the received signal quality information for neighbor base station 201-*b* reported from the terminal 203, the cell sizes of neighbor cells, and load information on its own cell and other cells.

The process is described in detail utilizing FIG. 9, FIG. 14, FIG. 15 and FIG. 16. When operating as a serving cell, the base station generates handover judgment criteria values as conditions for the cell size of its own cell and neighbor cell in compliance with the flow shown in FIG. 9. The handover judgment criteria values are values based on the interference level of the entire system. The handover judgment criteria values are equivalent to cost function thresholds for the handover judgment described later on and are standards for deciding whether to perform a handover or not.

Figure 9:
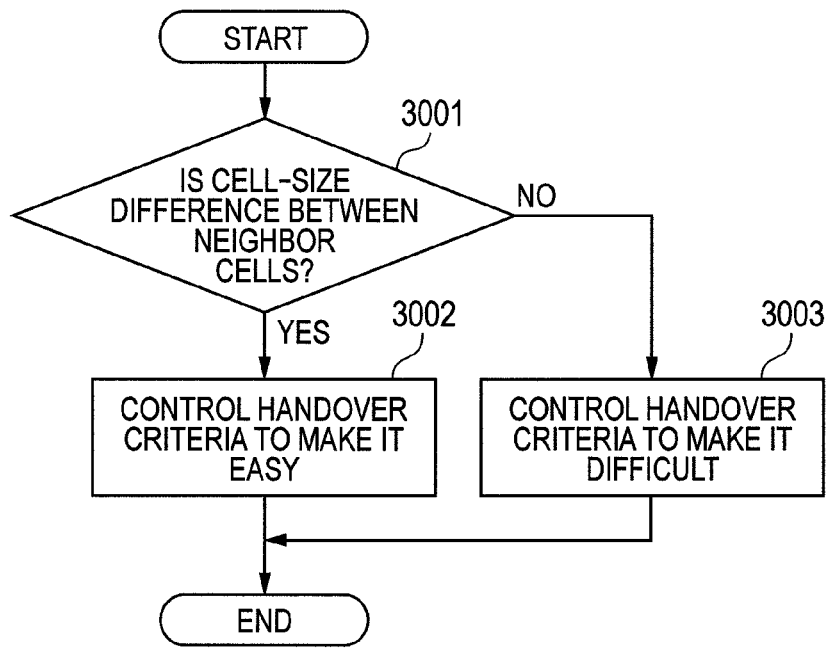
FIG. 9 is a flowchart showing the process flow when using the cell size to adjust the handover judgment criteria values.

FIG. 9 is a flow chart showing usage of the cell size to adjust the handover judgment criteria values.

In step 3001, the serving cell 201-*a* judges whether there is a cell-size difference between the neighbor cells. As one example, the serving cell 201-*a* judges whether its own cell size is larger than the neighbor cell size. If the serving cell 201-*a* radius is larger than the neighbor cell size, then the process proceeds to step 3002. If its own cell size is smaller than the neighbor cell size, then the process proceeds to step 3003.

In step 3002, the serving cell 201-*a* eases the handover judgment criteria in order to facilitate handover to the neighbor cell having a cell size smaller than its own cell. The serving cell 201-*a* may for example lower the handover judgment criteria values.

In step 3003, the serving cell 201-*a* controls the handover judgment scheme to be difficult. As one example, stricter in neighbor cells having a cell size larger than its own cell in order to make the handover more difficult to achieve. The serving cell 201-*a* may, for example, raise the handover judgment scheme values. The above described steps 3001 through 3003 are executed for each of the neighbor cells. Default values for the handover judgment scheme are set beforehand.

The table in FIG. 14 shows a summary of results from carrying out the processing in steps 3002 and 3003. The processing adjusts the handover judgment criteria values for each object cell ID based on the cell size difference. As can be seen in FIG. 15, the larger the difference in cell size versus its own cell, the more the control quantity can be enlarged. The numerical values shown in FIG. 15 are only examples, and different values may be given according to the method for evaluating interference levels in the overall system. The base station may retain the mutual relationship between the control quantity and the cell size difference in advance in a table as shown in FIG. 15. The processing may self-adjust the control quantity based on the handover results and the change in the system interference level.

Figure 16:
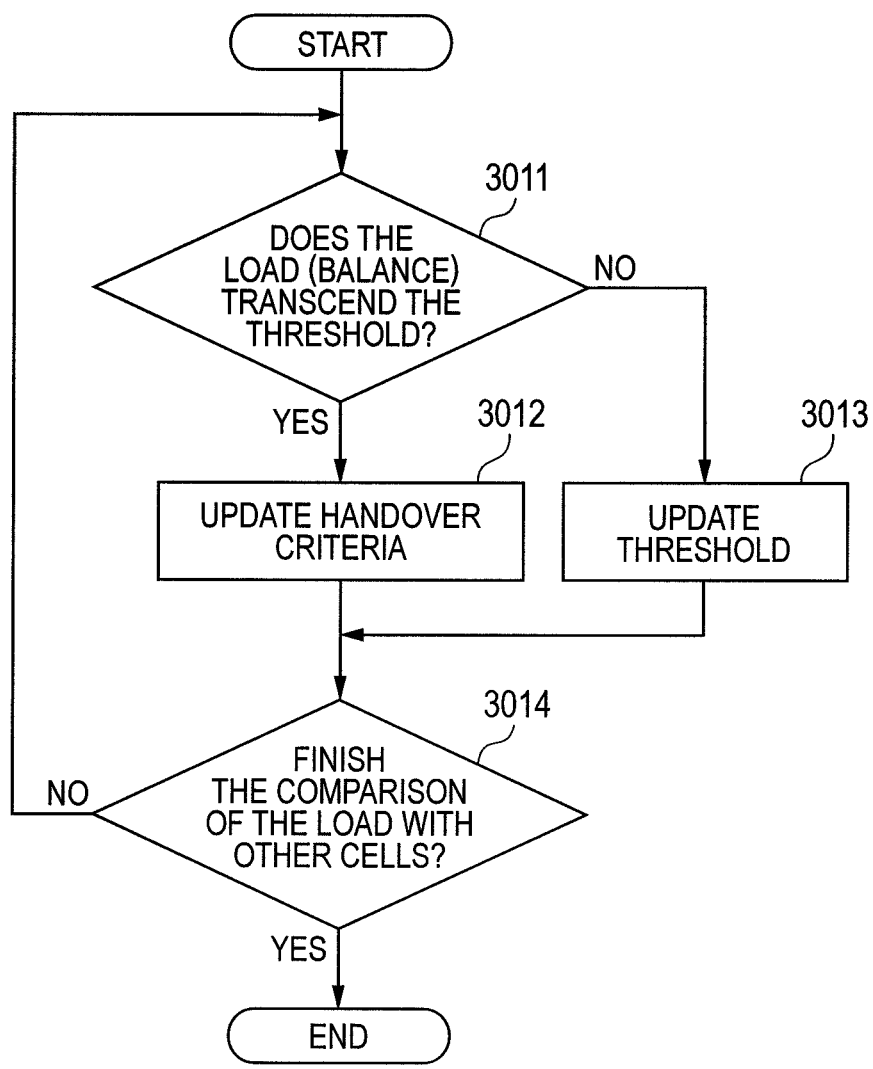
FIG. 16 is a flow chart showing the flow when using the load information to adjust the handover judgment criteria.

FIG. 16 is a flow chart showing the flow when using the load information to adjust the handover judgment criteria.

Load dispersal may be attempted in the same way by making a cell handover from a cell with a high load to a cell with a low load. More specifically, the serving cell 201-*a* adjusts the handover judgment criteria values according to the load information in the flow complying with FIG. 16. The processing described in FIG. 16 may be implemented on each individual neighbor cell. This processing is based on the following concepts. Low-load yet strong interference cells are allowed to provide high-speed communications by making use of their load margin even with low frequency (bandwidth) usage efficiency. In other words, a certain amount of interference is permitted.

High-load yet strong interference cells however require high frequency (bandwidth) usage efficiency in order to provide high-speed communication. So in a state where there is no allowable load capacity margin, handover of terminals to low load cells should be promoted (made easier) in order to obtain high-frequency usage efficiency.

An important factor to keep in mind is that in handovers from a small cell size to a large cell size, the interference power transmitted by the terminal is larger than in handovers from a large cell size to a small cell size.

In step 3011, the serving cell 201-*a* judges the difference (load balance) between its own cell and the neighbor cell being compared has exceeded a pre-stored threshold value or not. If the load balance has exceeded the threshold value then the process proceeds to step 3012. If the load balance did not exceed the threshold then the process proceeds to step 3013. The adjustment of the handover judgment criteria in step 2103 in FIG. 8 is also intended to balance the load with the neighbor cells so the adjustment is made based on load information relative to the neighbor cell.

In step 3012, the serving cell 201-*a* eases the handover judgment criteria if the load on its own cell is heavy compared to the neighbor cell. If the load from its own cell is light compared to the neighbor cell, then the serving cell 201-*a* may make the handover judgment criteria stricter. After implementing this step the processing proceeds to step 3014.

Figures 17, 18:
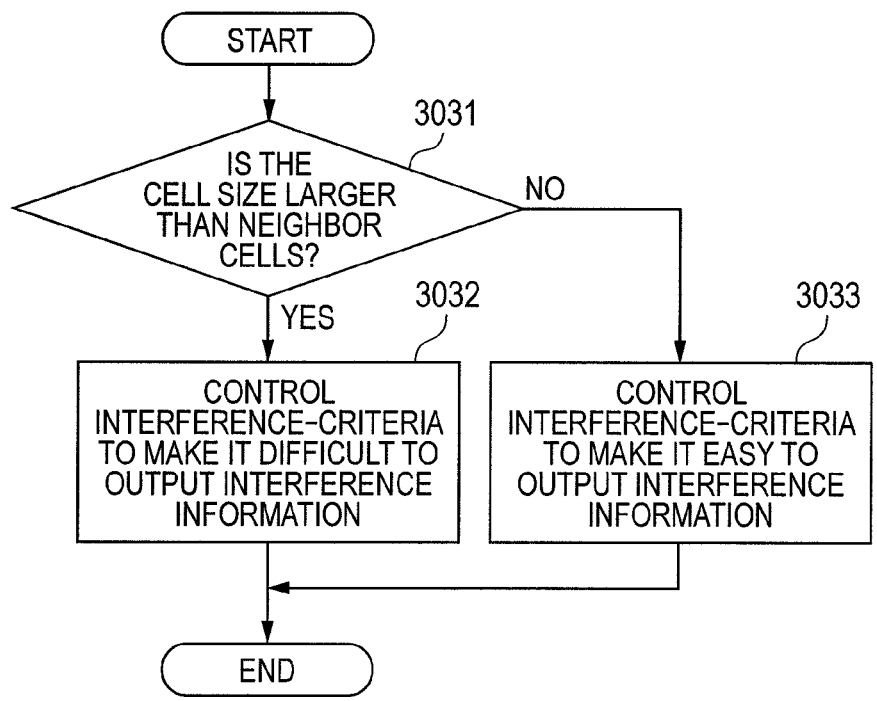
FIG. 17 is a table describing an example for adjusting the handover judgment criteria according to the difference in the load balance.
FIG. 18 is a flow chart showing the flow when adjusting the interference judgment conditions according to the cell size difference.

In step 3013, the processing updates (rewrites) the threshold value for the load balance used in step 3011 and the process proceeds to step 3014. In step 3014, if the processing detects that comparison of load balance values with threshold values has ended then the process flow is terminated. If the comparison has not ended then the processing returns to step 3011. The scanning of the control quantity table and the load balance threshold values such as in FIG. 17 allow implementing this processing. FIG. 17 shows a tendency for the control quantity of handover judgment criteria to widen the larger the load balance becomes. The values recorded here are only examples.

The above description showed the serving cell 201-*a* adjusting the handover criteria values to be used for the handover judgment in step 2104.

The target cell 201-*b* utilizes the cell size of neighbor cells and the load information for its own cell and other cells to adjust conditions (interference judgment conditions) for judging that interference is being received. One purpose of this processing is to prevent cells with light loads from making unnecessary claims of strong interference. Stated in reverse, a greater margin of tolerance is given to applied interference from cells with heavy loads.

Figure 10:
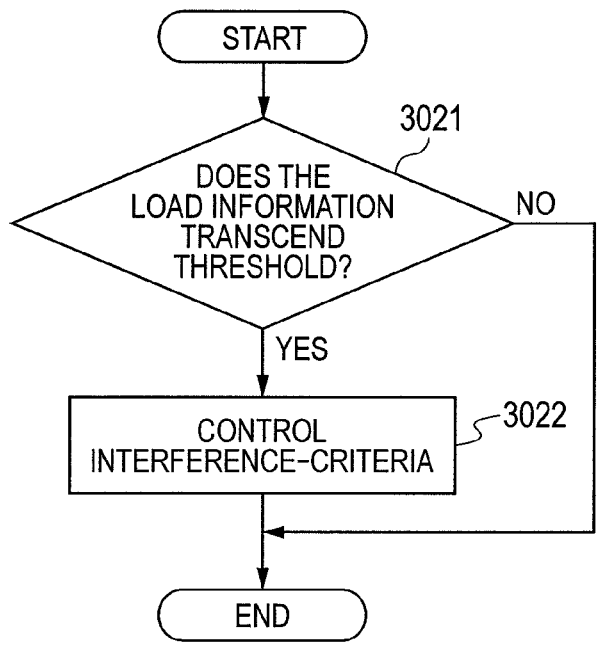
FIG. 10 is a flow chart showing the process flow when using the load information to adjust the interference judgment criteria.
Figure 11:
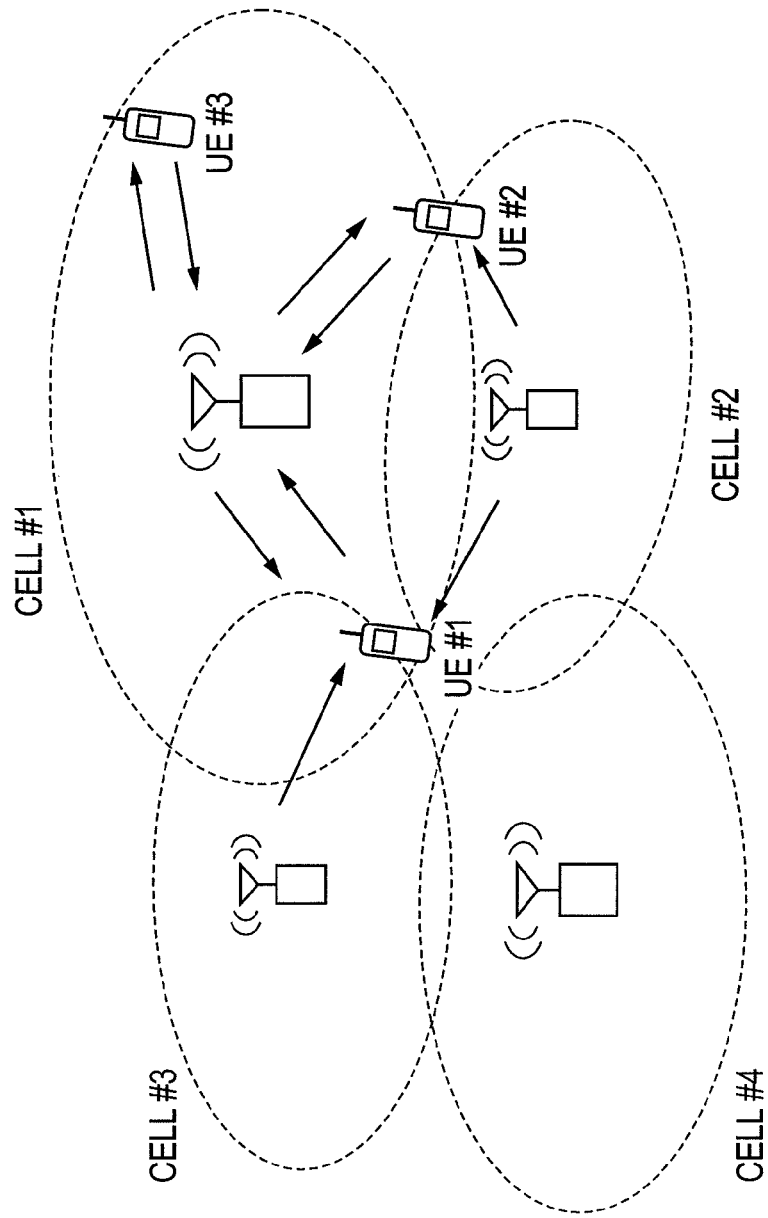
FIG. 11 is a diagram for describing the operation of the handover judgment block.

FIG. 10 is a flow chart for using load information to adjust the interference judgment criteria. The processing uses the load information to change the interference judgment method in accordance with the flow shown in FIG. 10.

In step 3021, the target cell 201-b compares load information for its own cell with load information of other cells, and if the difference in loads has exceeded a pre-established threshold value, then the processing proceeds to step 3022. The processing terminates if the threshold was not exceeded.

In step 3022, the target cell 201-b adjusts conditions for judging interference information for cells that exceeded the threshold. The target cell 201-b makes the interference judgment conditions stricter (more difficult) if its own cell has a heavier load. The target cell 201-b makes the interference judgment conditions weaker (easier) if its own cell has a lighter load. The target cell 201-b for example sets a higher threshold value for judging that interference is received.

FIG. 18 is a flow chart showing adjustment of interference judgment conditions according to the cell size difference. The target cell 201-b adjusts the interference judgment conditions according to the radius of the neighbor cells in compliance with the flow shown in FIG. 18.

In step 3031, the target cell 201-b compares the cell size of the neighbor cell within the cell size of its own cell. If the radius of its own cell is larger than the neighbor cell then the processing proceeds to step 3032; and if the cell size is smaller than the neighbor cell the processing proceeds to step 3033.

In step 3032, the target cell 201-b may set more difficult interference judgment conditions. The conditions are more difficult because cells with a large radius apply a large degree of interference to neighbor cells. If using received interference levels as the interference information in this processing, then the target cell 201-b may set a large received interference level and report this level.

In step 3033, the target cell 201-b may execute processing to set easier interference judgment conditions. If using received interference levels as interference information then the received interference level may be set lower and reported because cells with a small radius apply comparatively little interference to neighbor cells. The serving cell 201-a and target cell 201-b periodically exchange the interference information (equivalent to step 2102) and the changed interference judgment conditions can for example be reflected at the next timing period in the exchanged interference information.

One method with the E-UTRAN given as an example, utilizes a load indicator for reporting the received interference level by way of an inter-base station interface X2. The overload indication (OI) in the load indicator can be used to report the received interference level. The OI specifies the interference level as High, Middle, or Low for each resource block (RB). The RB are wireless resource allocation units (essentially sub-carriers) based on the OFDMA scheme allotted by time and by frequency. Though not OFDMA, the OI may be applied to methods such as SC-FDMA (utilized for example, in the uplink for E-UTRA) for allotting resources by time and frequency. If utilizing OI, then the High, Middle, Low judgment criteria may be changed based on the cell size and load information.

A portion of the serving cells are seen by other cells as target cells and therefore all base stations may perform the operation in this step 2103. Moreover, there is always more than one target cell as seen from the standpoint of a serving cell so the processing in step 2103 is performed between multiple base stations.

Returning to the handover judgment in step 2104 in FIG. 8, the serving cell 201-a generates a handover cost function from the interference information and load information exchanged with the target cell and from the signal quality (for example reference signal power) reported from the terminal 203; and then compares the generated handover cost function with the handover criteria value. The processing initiates a handover of the terminal 203 if the cost function value exceeds the handover criteria value.

Figure 13:
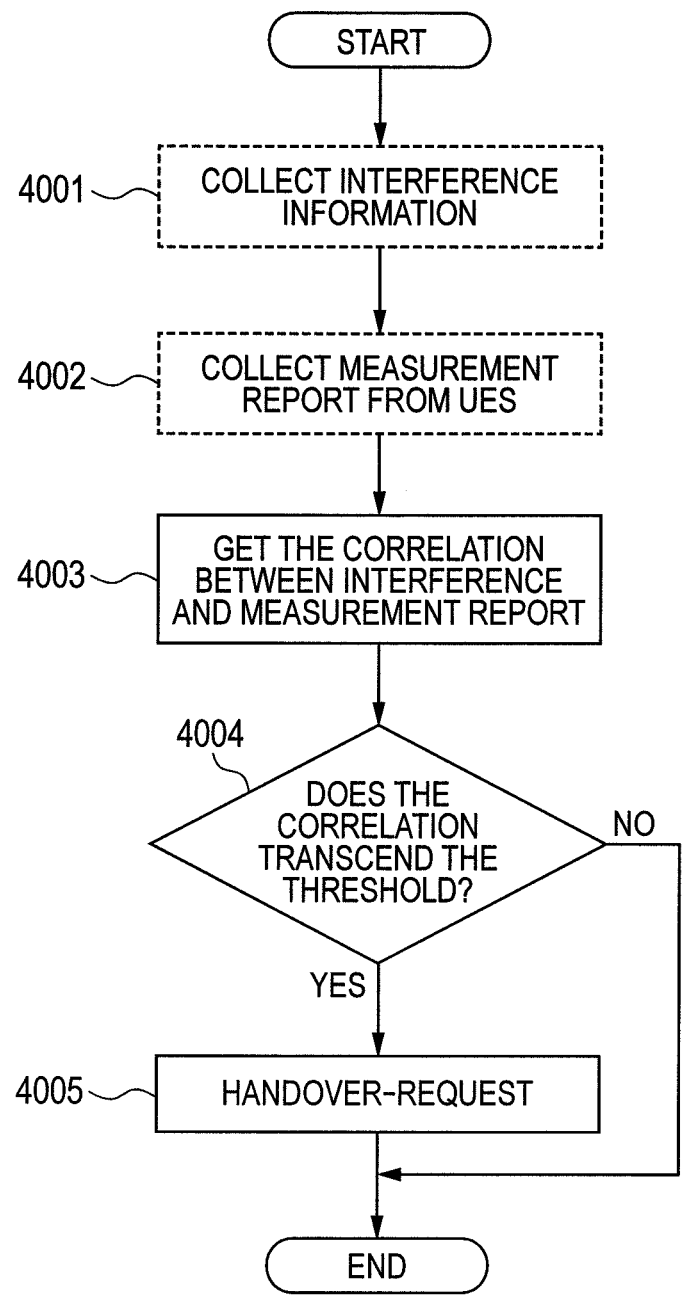
FIG. 13 is a flow chart of the handover judgment block which is a unique feature of the present invention.

The handover judgment processing flow is next described using FIG. 13.

In step 4001, the serving cell 201 collects interference information from the neighbor cells. The inter-base station interface E-UTRAN for example may gather information by utilizing an X2 interface, etc. Step 4001 may be omitted from the processing by utilizing the interference information acquired in step 2102-a.

In step 4002, the serving cell 201-a collects reference signal received power from neighbor cells that was reported by the cell edge terminal 203 located within its own cell. The terminal 203 generates a handover event by receiving reference signals from multiple neighbor cells, and may report the reference signal received power from neighbor cells to the serving cell. Step 4002 may be omitted from the processing by utilizing the reference signal received power in step 2003.

In step 4003, the serving cell 201-a finds the correlation between the reference signal received power from neighbor cells reported by the terminal 203 and the neighbor cell interference information exchanged between the base stations. The value of this correlation is defined as the cost function.

This step describes the method for finding the correlation while utilizing FIG. 11, FIG. 12, FIG. 22 and FIG. 23. In the example shown in FIG. 11, the terminals (UE) #1, UE#2, UE#3 belong to the cell #1. Here, UE#1 is at the cell edge of cell #1, and can receive reference signals from cell #2 and cell #3 heading downstream. The UE#2 can receive reference signals headed downstream from cell #1 and cell #2; and UE#3 can receive downstream headed reference signals from cell #1.

The UE#1 at this time reports the reference signal received power from cell #2 and cell #3 functioning as the target cells in addition to the received power from the serving cell to the cell #1 functioning as the serving cell (Step 2003 or Step 4002). The UE#2 reports the reference signal received power from cell #1 and cell #2 in the same way to the cell #1. The cell #1 functioning as the serving cell in this way receives reports of received power information from neighbor cells of terminals under its control, and manages the table (received power report table) 4012 that stores the corresponding neighbor cell and reported power relations as shown in FIG. 22. The cell #1 functioning as the serving cell updates (rewrites) the applicable table according to the terminal connection status and reported power values.

Figure 12:
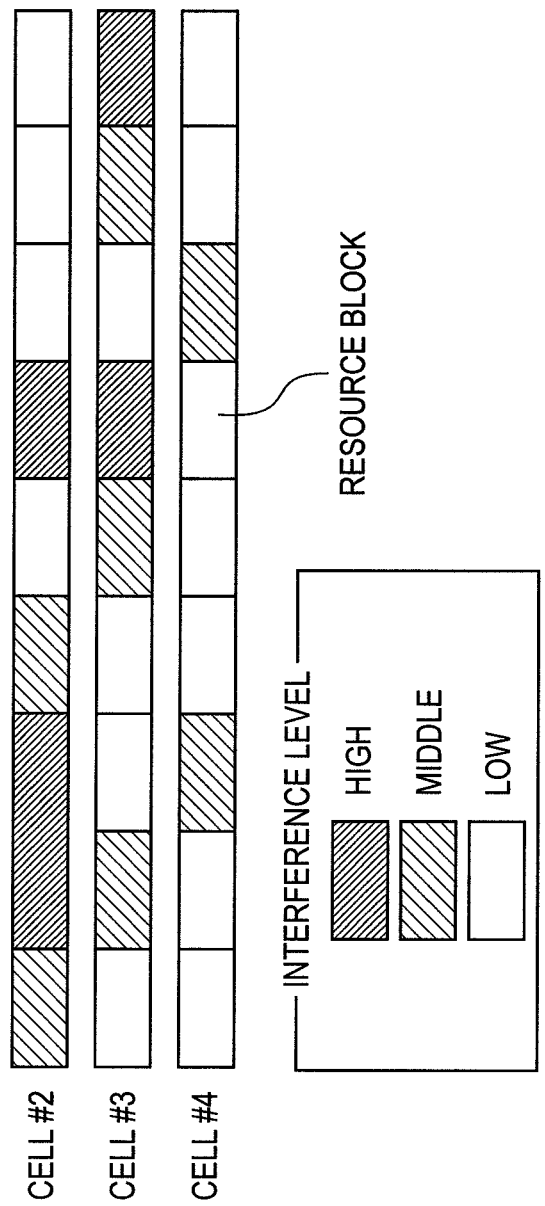
FIG. 12 is a diagram describing an example (OI) of interference information per each resource block (RB)

The serving cell #1 is receiving the received interference information from the target cell #2 and cell #3 over the inter-base station interface (step 2012a or 4001). This received interference information may be in RB units as shown in FIG. 12. The serving cell collects the interference information from neighbor cells; and while retaining an interference management table 4013 as shown in FIG. 23, updates the information every time the interference information is reported.

Under conditions such as described above, the serving cell #1 searches the interference information in the interference management table 4013 shown in FIG. 23, for the target cell #2 and cell #3 power information stored in the Received Power Report Table 4012 in FIG. 22 when calculating the handover cost function of UE #1. The serving cell #1 likewise searches interference information from cell #2 in the table when calculating the handover cost function of UE #2.

The effect of the cell size is taken into account when calculating the handover cost function from the interference information. The distance between UE #1 and each cell is estimated and the distance attenuation (path loss) calculated from the reference signal received power information of each cell and from the neighbor cell transmit power acquired in step 2101 that was reported by UE #1. The distance attenuation may for example be found based on the value by subtracting the reference signal received power of the terminal from the cell transmit power information. If the cell size or cell ID was received in step 2101 rather than the transmit power, then the processing may estimate the transmit power from the cell size and then find the distance attenuation from the estimated transmit power. The processing may find the distance between UE #2 and each cell in the same way.

The processing then weights the interference information exchanged between base stations by utilizing the distance attenuation (path loss) values. The path loss ratios of the UE #1 and cell #2, cell #3, UE #2 and cell #3 for example are then calculated. To form a specific example for calculation, these cells are set to respective values of 10:20:15 (See FIG. 2.). The size of the path loss may be set approximately equivalent to the upstream transmit power which must be set to a high figure.

The received interference information is converted to a function. For purposes of simplicity, interference information is assumed to rate scores such that High=2 points, Middle=1 point, and Low=0 points. The UE #1 cost function for cell #2 at this time is calculated as (1+2+2+1+2)×10=80 when the interference information is fed back as shown in FIG. 12. The cost function value is found in this way by multiplying a value proportional to the above described distance attenuation by the sum of the specified RB figure for the counted interference information. The cost function for UE #2 is calculated for cell #2 in the same way (1+2+2+1+2)×15=150. If limited only to cell #2, then UE #2 will have a higher cost function but UE #1 will also possess a cost function for cell #3. The UE #1 cost function for cell #3 is calculated as (1+1+2+1+2)×20=140, and the total cost function for UE #1 is 220 which is higher than the 150 of UE #2, and allows deciding the size of the interference level applied to the system. An interference-based method that takes into account the effects on other target cells may therefore also be utilized in this way when deciding the terminal to handover to one target cell.

In step 4004, the serving cell judges whether any of the handover candidate terminals have exceeded the cost function (handover judgment criteria adjusted in step 2103). The total cost function value for each terminal (220 in the example for UE #1 given above) can be utilized here. If the value exceeded the threshold then that terminal is set as a handover terminal and the processing proceeds to step 4005. The processing may be terminated if the threshold was not exceeded. Rather than using the above described method based on the interference level, a handover method can instead be used that simply selects the handover terminal based on the path loss found from focusing on a one target cell.

In step 4005, the cell (handover destination cell) to hand over the terminal that was selected for handover in step 4004 is decided, and the processing proceeds to handover inquiry processing (step 2005). In the method for setting the cell as the destination for the terminal handover, the processing may search the received power report table 4102 in FIG. 22 and set the cell having the largest power value reported by the terminal for handover. Selection priority may also be given to cells with a small cell size by taking into account information in FIG. 21 for managing the cell size. Moreover, the handover destination base station for moving the terminal to may be a cell having the smallest cost function value after movement.

Then need for a handover and selection of a cell as a handover destination may for example be made as follows.
(1) Decide the need for a handover by judging the cost threshold as described above, and select the cell to serve as the handover destination by judging the path loss.
(2) First of all, decide if a handover is needed by comparing the path loss, and select the cell to serve as the handover destination by judging the path loss. Also set AND conditions for the need for a handover by judging the cost threshold value. The previous two processes correspond to conventional methods for making a decision by path loss comparison, and a portion taking the system interference level into account can be added here.

In step 2005 in FIG. 8, the serving cell 201-*a* inquires to the target cell 201-*b* serving as the handover destination, about whether the handover of the terminal 203 is allowable. If there is an interface that allows direct exchange between the serving cell 201-*a* and the target cell 201-*b* then the applicable interface maybe utilized. If there is no suitable interface then an inquiry may be made by way of the higher layer entity 204 and the core network 202 to the target cell 201-*b*.

In step 2006, the target cell 201-*b* decides whether to admit a new terminal 203 (admission control). The target cell 201-*b* may utilize information such as the RB usage rate, traffic type, or number of connected terminals as load information for the judgment criteria. During admission of new terminals, admission can be refused to those terminals whose load information reaches a specified value.

In step 2007, the target cell 201-*b* informs the serving cell 201-*a* if admission was decided in the admission control results in step 2006. This notification may be made by an interface between the serving cell and target cell the same as in step 2005. If there is no interface, then notification is made by way of the upstream device 204 and the core network 202.

In step 2008, the serving cell 201-*a* performs downstream headed resource allocation in order to report the RRC Connection Reconfigure, when an ACK was returned for the handover request from the target cell 201-*b*.

In the RRC Reconfigure in step 2009, the serving cell 201-*a* notifies terminal 203 of information for performing the handover of the terminal 203 to the target cell 201-*b*.

Preparation for the handover was completed in the above steps. The handover is then performed according to the specified handover procedures. The terminal 203 for example executes the processing for terminating the connection with the serving cell 201-*a*, and implements synchronization processing with the target cell 201-*b* (step 2012). Moreover, the serving cell 201-*a* takes over the transfer to target cell 201-*b* of packets being communicated and buffer data held for use by the terminals (step 2011).

The process in the above flow chart is loop operation, and the process proceeds while mutually searching information such as the load information and interference information.

Second Embodiment

Figure 19:
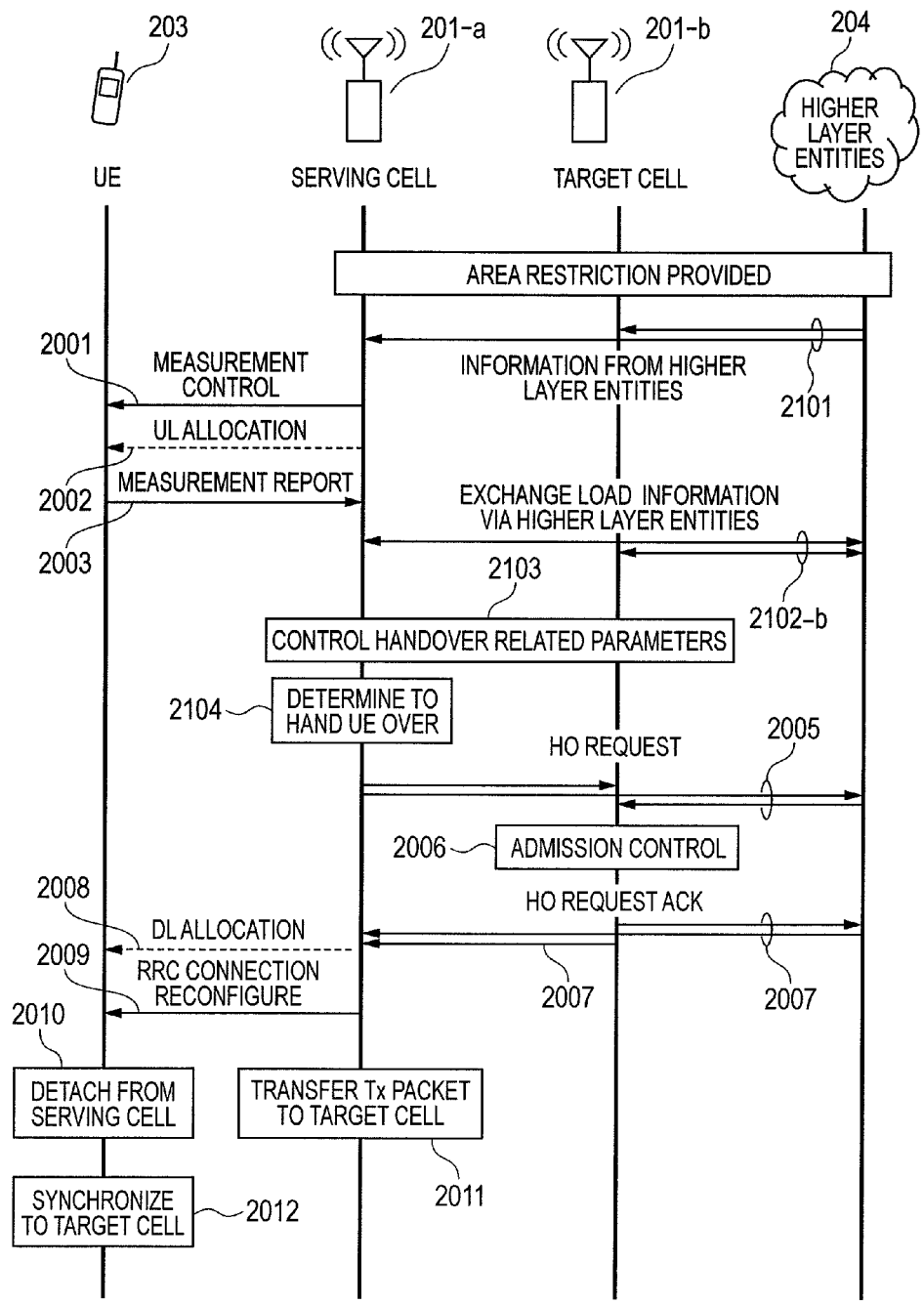
FIG. 19 is a drawing showing the handover sequence in the second embodiment of the present invention.

FIG. 19 is a drawing showing the handover sequence in the second embodiment.

The second embodiment is described next while referring to the sequence drawing shown in FIG. 19. The point where this embodiment differs from the first embodiment is that no interface is needed to directly exchange information between base stations but in all other points the embodiments are identical. This embodiment will for example likely prove applicable to femtocell base stations. Femtocell base stations are applicable because they can be connected to back haul lines provided to Internet Service Providers (ISP).

The following step 2102-*b* here replaces the process implemented in step 2102. In step 2102-*b*, the higher layer entity 204 serves as an intermediary to report interference information and load information that was reported by the inter-base station interface (such as the X2 interface for E-UTRAN). The upstream device 204 may for example report by way of an interface called the S1 interface in E-UTRAN that couples the base station and MME.

The higher layer entity 204 may also contain an EMS device, etc. In other words, a cell ID such as that for a macrocell base station can be assigned to the EMS device (HeMS) that functions as the upstream device 204 of the femtocell base station to achieve operation like that of a macrocell base station. The hardware structure can be implemented by a base station as shown in FIG. 7 and a base station control device such as shown in FIG. 6.

The technique for collecting interference information and load information may include methods where the femtocell base station gathers information on its own.

In one such method the femtocell base station receives neighbor cell reference signals. The femtocell base station may also generate interference information predicted to be generated by the neighbor cell based on the transmit power of the base station itself and (RF) power being received. Alternatively, the femtocell base station may generate interference information level based on quality information reported from the terminal.

The femtocell base station may also adjust the size of the base station backhaul line capacity as well as the backhaul line's usage ratio as the load information values. This adjustment maybe needed because the backhaul line provided by the ISP may have insufficient performance.

Third Embodiment

Figure 20:
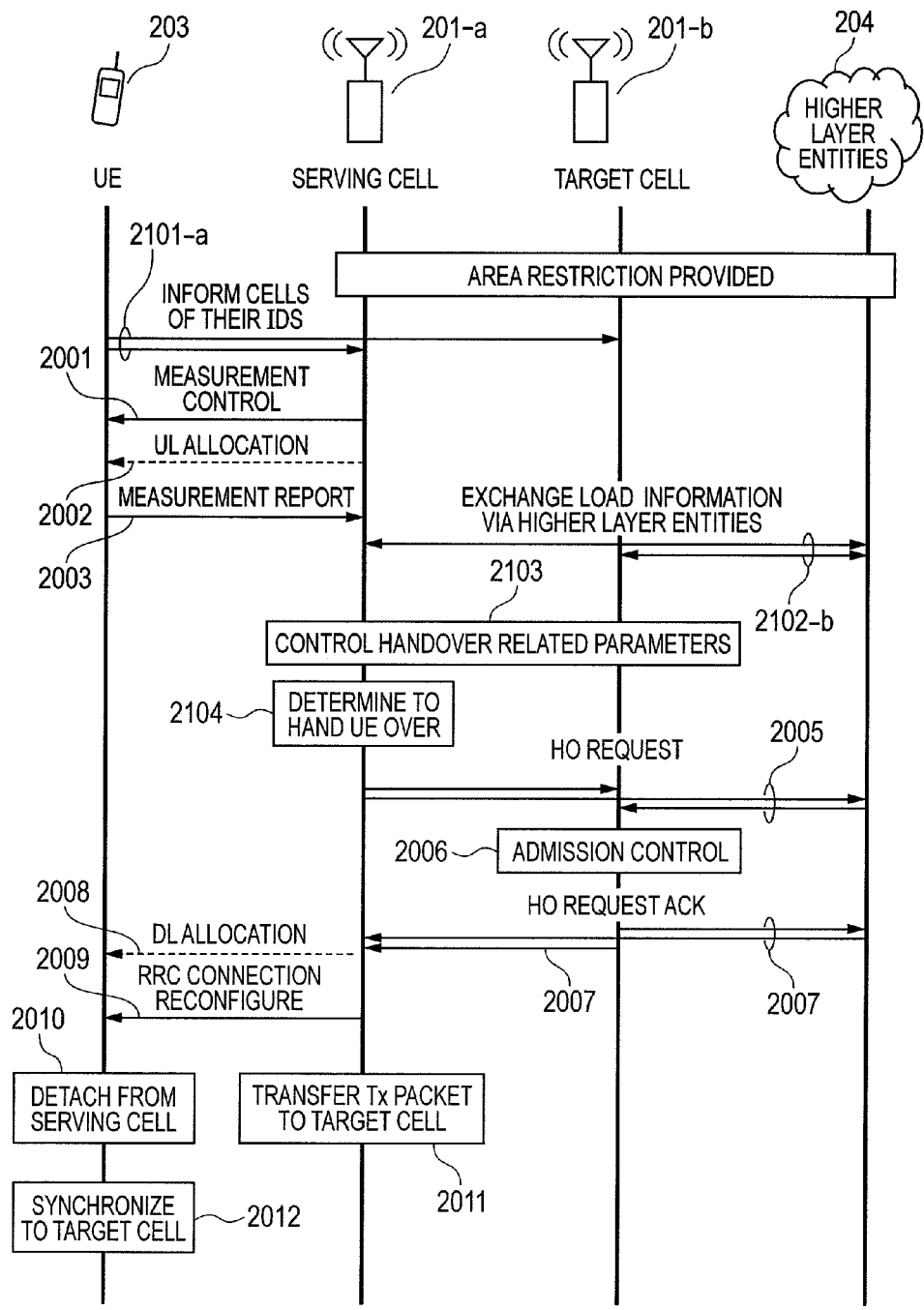
FIG. 20 is a drawing showing the handover sequence in the third embodiment of the present invention.

FIG. 20 is a drawing showing the handover sequence in the third embodiment. Among the process flows shown in FIG. 8 described in the first embodiment, the processing in step 2101 may be implemented as shown next. The terminal 203 may be set to report acquisition of cell size information from neighbor cells via the neighbor cell ID rather than via the upstream device 204 (step 2101-*a*). The type of neighbor cell can be identified from the reported cell ID by dividing up the range in which cell ID are allocated among femtocell and macrocell base stations. All other processing is the same as the first embodiment.

The hardware structure is implemented by the base station shown in FIG. 7, and the base station control device shown in FIG. 6.

Fourth Embodiment

The fourth embodiment describes a method for indirectly adjusting the handover judgment criteria in steps 3002, 3003, 3012 and 3013 of the first, second, and third embodiments.

In this method, an offset may be specified for the power value of the terminal reported from the base station in step 2001 in order to make the handover judgment criteria easier. Namely, the base station may process the received power from a cell with a small radius to report it as a larger value. The offset width may also be increased at this time when the cell size difference becomes larger.

In E-UTRAN for example, the method for selecting the Q_offset which is an RRC parameter relating to Cell Reselection during IDLE_MODE can be changed according to the judgment criteria.

The present invention can be utilized in wireless communication systems containing multiple base stations possessing different cell characteristics such as multiple base stations having different cell sizes.

What is claimed is:

1. A base station comprising a CPU, for reducing radio wave interference in wireless communication systems which includes a plurality of base stations with different cell area sizes, wherein
the base station is configured to:
acquire a cell area size information for its own base station and coverage information, the coverage information including cell area size information for neighbor base stations;
decide based on the cell area size information for its own base station and the cell area size information for neighbor base stations, whether the cell area size of its own base station is larger than a cell area size of a candidate neighbor base station; and
if the cell are size of its own base station is larger than the cell area size of the candidate neighbor base station, apply a handover judgment scheme which is more apt to handover a terminal within its own base station cell to a base station cell of the candidate neighbor base station, in comparison to another handover judgment scheme used to determine whether to handover the terminal to another neighbor base station cell if the cell area size of its own base station is not larger than the cell area size of the another neighbor base station; wherein the base station includes:
an interface configured to obtain the cell area size information of its own base station and cell area size information of the candidate neighbor base station;
a handover parameter control block configured to set the handover judgment scheme used to decide whether or not to handover the terminal within the cell of its own base station to the cell of the candidate neighbor base station, where the handover judgment scheme is set according to cell area size information of its own base station and cell area size information of the candidate neighbor base station;
a handover judgment unit configured to decide whether or not to handover the terminal to the cell of the candidate neighbor base station by using the handover judgment scheme and by using evaluation values that are based on signal quality in an optional terminal within its own cell; and
wherein, when the cell area size of its own base station is smaller than the cell area size of the candidate neighbor base station, the handover parameter control block is configured to makes a handover decision less apt to handover, by making the handover judgment scheme more difficult.

2. The base station according to claim 1, wherein the handover parameter control block is configured to acquire the load information of the candidate neighbor base station, and make the handover judgment scheme more apt or less apt to handover, according to the difference between the load information of its own base station, and load information of the candidate neighbor base station.

3. The base station according to claim 1, wherein the handover judgment unit is configured to acquire interference information with the neighbor cell, the to determine an evaluation value for the optional terminal within its own base station by multiplying the interference information with the neighbor cell by the signal quality in the optional terminal within its own cell, and to hands over the terminal to another cell if the evaluation value exceeds a threshold value which is based on the handover judgment scheme.

4. The base station according to claim 3, wherein the handover parameter control block is configured to handle the interference information in resource block units.

5. The base station according to claim 3, wherein plural candidate neighbor base stations represent handover destinations, and a handover destination of the terminal designated for handover by the handover judgment unit, is a cell of the plural candidate neighbor base stations which has a highest signal quality measured by the terminal, or the cell having a lowest evaluation value after handover.

6. The base station according to claim 3, wherein base station is configured to adjust a threshold value used for judging that interference is received, according to the area size difference between the cell of its own base station and the cell of the candidate neighbor base station; and to set a larger threshold value if the cell area size of its own base station is larger than the cell area size of the candidate neighbor base station, in comparison to a value if the cell area size of its own base station is smaller than the cell area size of the candidate neighbor base station, in order to set a larger tolerance margin for received interference for cells with a smaller radius.

7. The base station according to claim 3, wherein the base station is configured to adjust a threshold value used for judging that interference is received, according to the difference in the load information of its own base station and the candidate neighbor base station; and to set a larger threshold value if the cell area size of its own base station is larger than the cell area size of the candidate neighbor base station, in comparison to a value if the cell area size of its own base station is smaller than the cell area size of the candidate neighbor base station, in order to set a larger tolerance margin for cells with a smaller load.

8. The base station according to claim 1, wherein the cell area size information contain any one or multiple information types in the following list: transmit power information, an antenna gain, an antenna tile, and base station types according to base station scale.

9. The base station according to claim 2, wherein the load information is a number of terminals connected to the base station, or is a hardware usage rate exchanged between the base stations.

10. The base station according to claim 3, wherein the interference information is information exchanged between base stations, or is an overload indicator exchanged between base stations.

11. The base station according to claim 1, wherein the base station is configured to set a power offset to a power value reported from the terminal, in order to facilitate the handover to cells with a smaller radius than a radius of the base station.

12. A wireless communication system including a plurality of base stations with different cell area sizes, and terminals which can travel between the plurality of base stations, and that reduces radio wave interference in the systems, wherein
the base stations each include a CPU, and are each configured to:
acquire a cell area size information for its own base station and coverage information, the coverage information including cell area size information for neighbor base stations;
decide based on the cell area size information for its own base station and the cell area size information for neighbor base stations, whether the cell area size of its own base station is larger than a cell area size of a candidate neighbor base station; and
if the cell are size of its own base station is larger than the cell area size of the candidate neighbor base station, apply a handover judgment scheme which is more apt to handover a terminal within its own base station cell to a base station cell of the candidate neighbor base station, in comparison to another handover judgment scheme used to determine whether to handover the terminal to another neighbor base station cell if the cell area size of its own base station is not larger than the cell area size of the another neighbor base station; wherein the base stations each includes:
an interface configured to obtain the cell area size information of its own base station and cell area size information of the candidate neighbor base station;
a handover parameter control block configured to set the handover judgment scheme used to decide whether or not to handover the terminal within the cell of its own base station to the cell of the candidate neighbor base station, where the handover judgment scheme is set according to cell area size information of its own base station and cell area size information of the candidate neighbor base station;
a handover judgment unit configured to decide whether or not to handover the terminal to the cell of the candidate neighbor base station by using the handover judgment scheme and by using evaluation values that are based on signal quality in an optional terminal within its own cell; and
wherein, when the cell area size of its own base station is smaller than the cell area size of the candidate neighbor base station, the handover parameter control block is configured to makes a handover decision less apt to handover, by making the handover judgment scheme more difficult.

13. The wireless communication system according to claim 12, wherein said each base station is further configured to set a power offset to a power value reported from the terminal in order to facilitate the handover to cells with a smaller radius than a radius of the base station.

14. A mobility control method effected by a base station, for mitigating inter cell interference for reducing radio wave interference in wireless communication systems including a plurality of base stations with different cell area sizes, and including terminals which can travel between the plurality of base station, the method comprising:
acquiring a cell area size information for its own base station and coverage information, the coverage information including cell area size information for neighbor base stations;
deciding based on the cell area size information for its own base station and the cell area size information for neighbor base stations, whether the cell area size of its own base station is larger than a cell area size of a candidate neighbor base station; and
if the cell are size of its own base station is larger than the cell area size of the candidate neighbor base station, apply a handover judgment scheme which is more apt to handover a terminal within its own base station cell to a base station cell of the candidate neighbor base station, in comparison to another handover judgment scheme used to determine whether to handover the terminal to another neighbor base station cell if the cell area size of its own base station is not larger than the cell area size of the another neighbor base station;

obtaining, by an interface, the cell area size information of its own base station and cell area size information of the candidate neighbor base station;

setting, by a handover parameter control block, the handover judgment scheme used to decide whether or not to handover the terminal within the cell of its own base station to the cell of the candidate neighbor base station, where the handover judgment scheme is set according to cell area size information of its own base station and cell area size information of the candidate neighbor base station;

deciding, by a handover judgment unit, whether or not to handover the terminal to the cell of the candidate neighbor base station by using the handover judgment scheme and by using evaluation values that are based on signal quality in an optional terminal within its own cell; and wherein, when the cell area size of its own base station is smaller than the cell area size of the candidate neighbor base station, the handover parameter control block is configured to makes a handover decision less apt to handover, by making the handover judgment scheme more difficult.

15. The mobility control method according to claim 14, wherein the base station is further configured to set a power offset to a power value reported from the terminal in order to facilitate the handover to cells with a smaller radius than a radius of the base station.

\* \* \* \* \*